July 22, 1930. C. E. REED Re. 17,741

EARTH BORING DRILL

Original Filed Feb. 27, 1928

INVENTOR:

Clarence E. Reed,

BY

Spear, Middleton, Donaldson & Hall

ATTORNEYS.

Reissued July 22, 1930 Re. 17,741

UNITED STATES PATENT OFFICE

CLARENCE E. REED, OF WICHITA, KANSAS, ASSIGNOR TO CHICAGO PNEUMATIC TOOL COMPANY, OF NEW YORK, N. Y., A CORPORATION OF NEW JERSEY

EARTH-BORING DRILL

Original No. 1,692,793, dated November 20, 1928, Serial No. 257,259, filed February 27, 1928. Application for reissue filed June 24, 1929. Serial No. 373,416.

My invention is an improvement in the type of earth boring drills shown in Letters Patent of the United States granted to me, for instance, Nos. 1,636,665–6–7, July 19, 1927, and concerns means for holding a rotary conical cutter on its spindle.

The invention consists in the features and combination and arrangement of parts hereinafter described and particularly pointed out in the claims.

Figure 1:
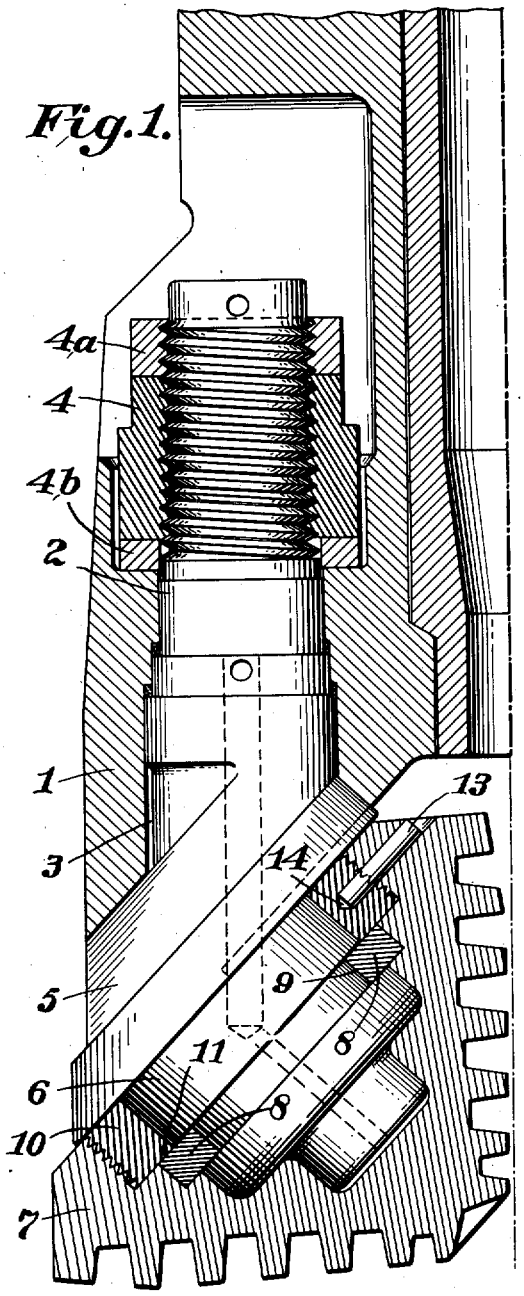
Figure 1 is a view of the roller cutter unit with parts in section and parts in elevation, and with a part of the head shown in section.
Figure 5:
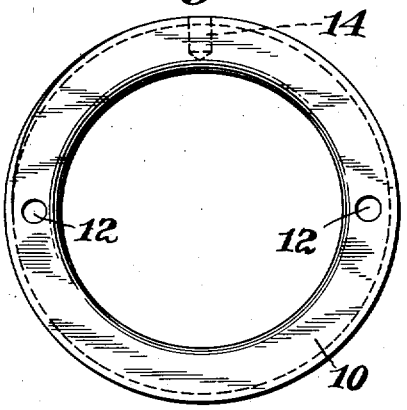
Fig. 5 is a face view of the threaded ring.
Figure 2:
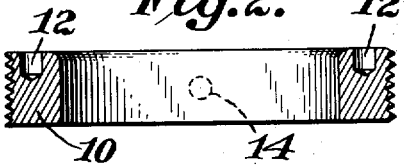
Fig. 2 is a sectional view of the threaded ring.
Figure 3:
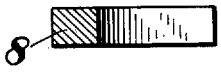
Fig. 3 is a sectional view of one of the locking segments.
Figure 4:
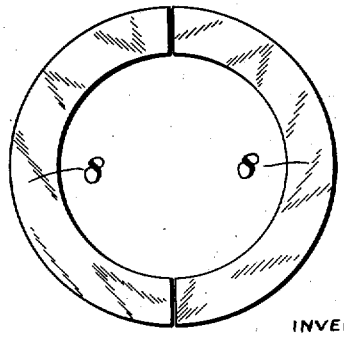
Fig. 4 is a face view of the locking segments.

In this drawing 1 indicates a part of the bit head. The roller cutter unit has a shank 2 to fit removably in a socket 3 of this head, where it is held by any suitable locking member such as indicated generally at 4. This may be of the form disclosed in Letters Patent of the United States granted to me.

The shank 2 extends at an angle from the base plate 5 of the unit, which base plate is adapted to fit a seat recess in the bit head.

From this base plate a spindle 6 projects and on this spindle the roller cutter 7 is revolubly mounted. The spindle may be of stepped form, presenting portions of different diameters as shown, or it may be of other forms, such for instance as conical.

The roller cutter which is conical or approximately so has a bore to fit in part the shape of the spindle. For locking the roller cutter on the spindle in such manner that it will be retained in proper position relative to the bit head and yet be capable of free rotative movement about the spindle, I provide floating segments 8, 8 mounted in a groove 9 of the spindle, and of such external diameter as to project from said spindle and thus provide, in effect, an annular rib or shoulder. The portion of the bore in the roller cutter adjacent this ring or shoulder made up of the segments is formed with a counterbore or annular seat recess to fit said ring. At the larger counterbore at the rear end of the bore of the roller cutter a ring 10 is mounted, this being connected with the cutter member by a screwthread, so that the said ring turns with the roller. The inner diameter of the screw ring 10 is such that it will turn freely on the spindle, and at the front side, i. e., at 11, the face of the ring contacts with the rear or inner face of the segmental locking ring 8, 8. By the engagement of the screw ring back of the segmental ring, the roller cutter is retained on the spindle, but with freedom of rotation thereon.

The screw ring has sockets at 12 by which a holding implement may be engaged with the ring to hold it while the roller cutter is turned to screw it onto the ring. When these parts, roller and screw threaded ring, have been assembled, they may be held by a pin 13 passing through the wall of the roller cutter into a socket 14 of the ring.

In assembling the parts of the roller cutter unit, this is done outside the bit head by first placing the screw ring on the spindle, thereafter placing the segments 8, 8 of the locking ring in position in the groove of the spindle, then screwing the roller cutter onto the screw threaded ring, and then, desirably, fixing the screw ring and roller cutter together by inserting the pin before mentioned.

The primary purpose of the segmental ring 8, 8 is to lock the cutter in place by providing a shoulder at its rear side against which the screw threaded ring will find a retaining bearing, it being understood that this screw ring when seated in the bore of the roller cutter virtually forms a part of said roller. The segmental ring is adapted to turn or float with the roller and thus has an anti-friction character or quality. In the event that lubricant is introduced into the bore of the roller, this ring will form a seal against its escape.

One way that the roller cutter may be lubricated is to lead oil through a conduit in the spindle, to the fore part of the bore of the roller cutter, so that this will find its way between the exterior of the spindle and the roller. The ring will prevent undue escape of this lubricant. It also resists back pressure in the well and keeps sand out of the bearing. It further resists the inward thrust from the side of the bore hole on the cone, and it carries part of the working load from the normal operating surface of the cone. This split locking ring enables a one piece screw threaded ring to be used.

The assembly can be quickly made. The screw threaded ring being in one piece can be handled as one body, and as no accurate registration of parts, such as in the case of a divided screw threaded ring, is necessary, the screwing on of the cone can be performed with certainty and with ease. The spindle, together with its base plate and shank, are all formed in one piece.

The split locking ring can be quickly assembled by placing its sections separately into position from opposite sides of the spindle into the groove formed therein.

The unit, consisting of the shank, base plate spindle and roller cutter mounted thereon as above described, is intended to be handled as one body in connecting it up with the head or in removing it therefrom.

It will be understood, however, that I do not limit my present invention to its application to this removable unit and the disclosure above made is not to be regarded as a limitation upon my invention, the scope of which is defined by the appended claims.

Referring to the specific means for holding the shank of the roller cutter unit in place, this in the illustrated embodiment of my invention consists of a nut 4 screw threaded onto the shank of the spindle with the left hand screw thread. There is a locking nut also screw threaded onto the shank at $4^a$ and there is a washer at $4^b$. The lock nut may be held on by a suitable cotter pin if desired. By reason of this arrangement, contact of the nut with the material at the side of the hole being drilled, will tend to tighten the nut instead of loosening it, this result being due to the direction in which the screw threads run relative to the direction of rotation of the drilling apparatus.

While I have shown the ring 10 as a screw threaded ring I do not limit myself to this manner of attaching this ring to the roller cutter.

I claim:

1. A roller cutter unit for earth boring drills comprising a spindle and shank, said spindle having an annular groove in its surface, a ring of one piece mounted to turn on said spindle, segmental pieces seated in the annular groove, and furnishing a retaining bearing for and engaging the front face of the ring, and a roller cutter mounted on the spindle and to which the ring is attached, said roller cutter having a bore adapting it to slip axially along the spindle over the segmental pieces to the ring for attachment thereto, substantially as described.

2. An earth boring drill according to claim 1 in which the segmental pieces are unattached to the roller cutter and are adapted to float in the annular groove of the spindle by the frictional contact of the ring and cutter therewith.

3. In earth boring apparatus, in combination, a spindle having a reduced portion in a plane transverse to its axis, locking members engaging said reduced portion of said spindle and projecting therebeyond, a roller cutter rotatably mounted upon said spindle and having an annular seat recess into which said members extend, and a retainer ring secured to said cutter and in engagement with said members.

4. In earth boring apparatus, in combination, a spindle having a reduced portion in a plane transverse to its axis, ring segments engaging said reduced portion of said spindle and projecting therebeyond, a roller cutter rotatably mounted upon said spindle and having an annular seat recess into which said members extend, and a one-piece retainer ring secured to said cutter and in engagement with said members, said ring having a bearing upon said spindle.

5. In earth boring apparatus, cutter parts for assembly upon a spindle having an annular groove, said parts comprising a roller cutter having a bore to receive the spindle, said bore being enlarged in the plane of said groove to form a seat recess and counterbored outwardly of said plane, a segmental locking ring to fit said seat recess and to extend into said groove, and a one-piece ring to be secured in said outward counterbore of said cutter for engagement with said segmental ring.

6. In earth boring apparatus, cutter parts for assembly upon a spindle having a reduced portion in a plane transverse to its axis, said parts comprising a roller cutter having a bore to receive the spindle, said bore being enlarged in the plane of the reduced part of the spindle to form a seat recess and having a threaded counterbore outwardly of said plane, segmental locking parts to engage the reduced portion of the spindle and to extend into said seat recess, and a one piece retainer ring having a threaded exterior to secure the same in the threaded counterbore of said cutter into retaining engagement with said segmental parts and having a smooth interior surface to have a bearing on the spindle.

7. In an earth boring apparatus, a supporting element for a roller cutter, comprising a shank and spindle disposed at an angle to each other and integrally united, said spindle having stepped coaxial cylindrical portions, the cylindrical portion adjacent said spindle being of substantial extent in an axial direction and having an annular groove adjacent its outer end to receive locking means.

8. In an earth boring apparatus, a supporting element for a roller cutter, comprising a shank and spindle disposed at an angle to each other and integrally united, said element being enlarged at the junction of said shank and spindle to provide a base plate, said spindle having stepped coaxial cylindrical portions, the cylindrical portions adjacent said spindle being of substantial extent in an axial direction and having an annular groove adjacent its outer end to receive locking means for a cutter.

9. In a rotary well drill and in combination, a cone cutter having a substantially flat base and a bore extending therefrom into the body of the cutter, a carrier for the cone including a base plate of greater area than the opening of the bore through the base of the cone, and a non-threaded spindle extending from the base plate into the bore of the cone, a ring adapted to be passed over the spindle and into engagement with the base plate prior to the positioning of the cone, retaining means brought into interlocking engagement with the spindle and into engagement with the ring after the latter has been placed in position and prior to the application of the cutter, said cutter being adapted to be positioned after the positioning of the ring and retaining means and interlocked with the ring.

10. In a rotary roller well drill and in combination, a supporting member, a spindle projecting therefrom and non-detachably connected at one end thereto, a cutter directly mounted on the spindle, and means for holding the cutter in place thereon, including an endless ring carried by the cutter and an element movable around the spindle and retained thereby against movement axially of the same, said cutter housing the spindle and said holding means.

11. In a rotary roller well drill and in combination, a spindle support, a spindle, a cutter mounted directly on the spindle, and means for holding it in place, including an endless ring positioned by moving it axially along the spindle from its free end towards its supported end, prior to the application of the cutter to the spindle.

12. A cone cutter having its conical surface toothed and provided with an axial bore opening into the same from its base and terminating within the body of the cone, the wall of the bore contiguous the closed end of the same providing bearing surfaces of dissimilar diameter, the bore further providing an annular recess for the reception of a retaining element contiguous the bearing surface of maximum diameter and of greater diameter than the same, and the bore providing between the base of the cone and the first named recess a second recess of greater diameter than the first for receiving a retaining ring.

13. A cone cutter having its conical surface toothed and provided with an axial bore opening into the same from its base and terminating within the body of the cone, the wall of the bore contiguous the closed end of the same providing bearing surfaces of dissimilar diameter, the bore further providing an annular recess for the reception of a retaining element contiguous the bearing surface of maximum diameter and of greater diameter than the same, and the bore providing between the base of the cone and the first named recess a second recess of greater diameter than the first for receiving a retaining ring, the last named recess having a threaded wall concentric to the axis of the cone.

14. A member providing a journal for a conical cutter and for supporting the latter in an inverted V-shaped recess in a bit head, said member comprising a base plate having a spindle extending substantially at right angles from one side thereof, and a shank extending at an angle from its other side, the parts being integral with one another, said spindle having a uniform cylindrical portion of substantial extent in an axial direction upon which the cutter is rotatably mounted, said cylindrical portion being provided with an annular groove in a plane perpendicular to its axis and intersecting the portion of the cutter of substantially its maximum diameter for receiving an element housed by the cutter acting to prevent movement of the latter axially of the spindle.

Signed at Wichita, Kansas, this 19th day of June, 1929.

CLARENCE E. REED.